(12) United States Patent
Yang

(10) Patent No.: US 6,698,788 B2
(45) Date of Patent: Mar. 2, 2004

(54) FOLDING STRUCTURE FOR INFANT STROLLER

(75) Inventor: Cheng-Fan Yang, Tainan Hsien (TW)

(73) Assignee: Link Treasure Limited, Tortola (VG)

( * ) Notice: Subject to any disclaimer, the term of this patent is extended or adjusted under 35 U.S.C. 154(b) by 2 days.

(21) Appl. No.: 10/046,268

(22) Filed: Jan. 16, 2002

(65) Prior Publication Data

US 2002/0185842 A1 Dec. 12, 2002

(30) Foreign Application Priority Data

Jun. 12, 2001 (TW) .......................... 90209762 U

(51) Int. Cl.[7] ................................................ B62B 7/06
(52) U.S. Cl. ...................... 280/647; 280/642; 280/650; 280/658
(58) Field of Search ................... 280/639, 642, 280/643, 647, 648, 649, 650, 658, 43.1; 297/42, 45

(56) References Cited

U.S. PATENT DOCUMENTS

| | | | | |
|---|---|---|---|---|
| 4,049,292 A | * | 9/1977 | Perego | 280/642 |
| 4,173,355 A | * | 11/1979 | Perego | 280/642 |
| 4,353,577 A | * | 10/1982 | Giordani | 280/642 |
| 4,449,732 A | * | 5/1984 | Surot | 280/644 |
| 4,697,823 A | * | 10/1987 | Kassai | 280/644 |
| 4,741,551 A | * | 5/1988 | Perego | 280/642 |
| 4,858,947 A | * | 8/1989 | Yee et al. | 280/643 |
| 4,966,379 A | * | 10/1990 | Mulholland | 280/242.1 |
| 5,020,816 A | * | 6/1991 | Mulholland | 280/250.1 |
| 5,050,899 A | * | 9/1991 | Stensby | 280/250.1 |
| 5,181,735 A | * | 1/1993 | Onishi | 280/642 |
| 5,263,730 A | | 11/1993 | Roach et al. | |
| 5,356,160 A | * | 10/1994 | Urlwin | 280/30 |
| 5,417,449 A | * | 5/1995 | Shamie | 280/642 |
| 5,516,142 A | * | 5/1996 | Hartan | 280/642 |
| 5,669,625 A | * | 9/1997 | Jane Cabagnero | 280/647 |
| 5,806,877 A | * | 9/1998 | Huang | 280/642 |
| 5,882,030 A | | 3/1999 | Haut | |
| 5,887,935 A | * | 3/1999 | Sack | 296/122 |
| 5,911,432 A | * | 6/1999 | Song | 280/643 |
| 5,915,722 A | * | 6/1999 | Thrasher et al. | 280/649 |
| D418,780 S | | 1/2000 | Everett et al. | |
| 6,155,740 A | * | 12/2000 | Hartenstine | 403/102 |
| 6,206,405 B1 | * | 3/2001 | Watkins | 280/647 |
| 6,241,273 B1 | * | 6/2001 | Gehr | 280/642 |
| 6,264,225 B1 | * | 7/2001 | Kunishige et al. | 280/250.1 |
| 6,375,213 B1 | * | 4/2002 | Suzuki | 280/649 |
| 2002/0195797 A1 | * | 12/2002 | Song | 280/642 |

* cited by examiner

*Primary Examiner*—Brian L. Johnson
*Assistant Examiner*—Kelly E Campbell
(74) *Attorney, Agent, or Firm*—Birch, Stewart, Kolasch & Birch, LLP

(57) ABSTRACT

A foldable structure for an infant stroller has a frame of an extended length for holding one or more seats. The frame is foldable and includes a handle bracket, armrests, front wheel brackets, rear wheel brackets and a seat bracket. The seat is mounted to the seat bracket. The seat has a backrest supported by an extendable rod. The extendable rod consists of an inner rod and an outer rod. The outer rod has a longitudinal trough to allow the inner rod to slide reciprocally therein. For installation, the inner rod is inserted into the longitudinal trough of the outer rod, pivotally engaged with the armrest, and the outer rod is pivotally engaged with the seat bracket. After completing all pivotal fastening, the armrest and seat bracket form a restriction to prevent the extendable rod from separating from the structure. When the frame is folding, the extendable rod is safer to use and more appealing because of no jutting screws or pins.

11 Claims, 8 Drawing Sheets

FOLDING STRUCTURE FOR INFANT STROLLER

FIELD OF THE INVENTION

The invention relates to an infant stroller, and particularly to an improved folding frame for an infant stroller.

BACKGROUND OF THE INVENTION

Infant strollers are generally made for holding a single seat. Some of the strollers may be converted to support a dual seat. U.S. Pat. No. D418,780 discloses an example in which a left seat and a right seat are arranged in a juxtaposed manner. There is a handle section equipped with a brake lever to facilitate maneuvering of the stroller. This type of stroller basically is not foldable. It takes a lot of space for transportation and storing, thus is not suitable for every family.

U.S. Pat. No. 5,263,730 proposes a dual seat stroller which has a front seat and a rear seat. Such type of stroller has relatively large wheels to allow the stroller to move on an uneven surface. It is also not foldable and takes a large amount of space for storage and transportation.

To overcome the non-foldable problem of dual-seat strollers, there is a need to provide foldable frames. In general, a stroller frame may be extended to hold a front seat and a rear seat. The extended frame includes at least a handle bracket, armrests, front wheel brackets, rear wheel brackets and a seat bracket. The handle bracket is substantially formed in an inverse "U" shape, and is located at the rear end of the infant stroller in an upright or inclined manner. The armrests are horizontally located on two sides of the infant stroller frame with rear ends thereof pivotally engaging with the handle bracket. The armrests may be pivotally turned and moved towards the handle bracket when the frame is folding.

Each front wheel bracket has an upper end pivotally engaging with the front end of the armrest. Each rear wheel bracket is located on one side of the infant stroller in an inclined manner, and has an upper end pivotally engaging with the front end of the armrest (adjacent to the upper end of the front wheel bracket), and a lower end pivotally engaging with a rear wheel through a wheel anchor block. Because the pivotal axes on the upper ends of the front wheel bracket and the rear wheel bracket are spaced close to each other, the front wheel bracket and the rear wheel bracket may be pivotally turned and moved closely toward each other when the frame is folded. As a result, space for transportation and storage can be saved.

Preliminary tests have shown that such infant strollers present difficulties in properly positioning supporting rods for the front seat. It could produce interference when the frame is folding and result in incomplete folding. One possible approach to resolve this issue is to make the supporting rods extendable. However commonly used extendable rods have exposed screws and slots, and are prone to incur scratching or cause injury to people during operation. The construction is also unsightly and does not have much appeal.

SUMMARY OF THE INVENTION

In view of aforesaid findings, the primary object of the invention is to provide a foldable frame for an infant stroller. Another object of the invention is to provide an improved extendable rod for the frame of the infant stroller.

The improved extendable rod of the invention includes an inner rod and an outer rod. The outer rod has a longitudinal trough to house the inner rod and allows the inner rod to slide reciprocally therein. For installation, the inner rod is inserted into the longitudinal trough of the outer rod, then the upper end axis of the inner rod is pivotally engaged with one armrest, and the lower end axis of the outer rod is pivotally engaged with the seat bracket. The armrest and seat bracket form a restrictive linkage to prevent the outer rod of the extendable rod from separating from the seat bracket.

According to an embodiment of the invention, the extendable rod may be extended or retracted based on continuous changes of the relative position of the armrest and seat bracket. The extendable rod also does not have exposed slots or screws during the extension or retraction process. It is safer to use and looks more attractive.

The foregoing, as well as additional objects, features and advantages of the invention will be more readily apparent from the following detailed description, which proceeds with reference to the accompanying drawings. The drawings are only to serve for reference and illustrative purpose, and are not intended to limit the scope of the invention.

DESCRIPTION OF THE PREFERRED EMBODIMENTS

Figure 1:
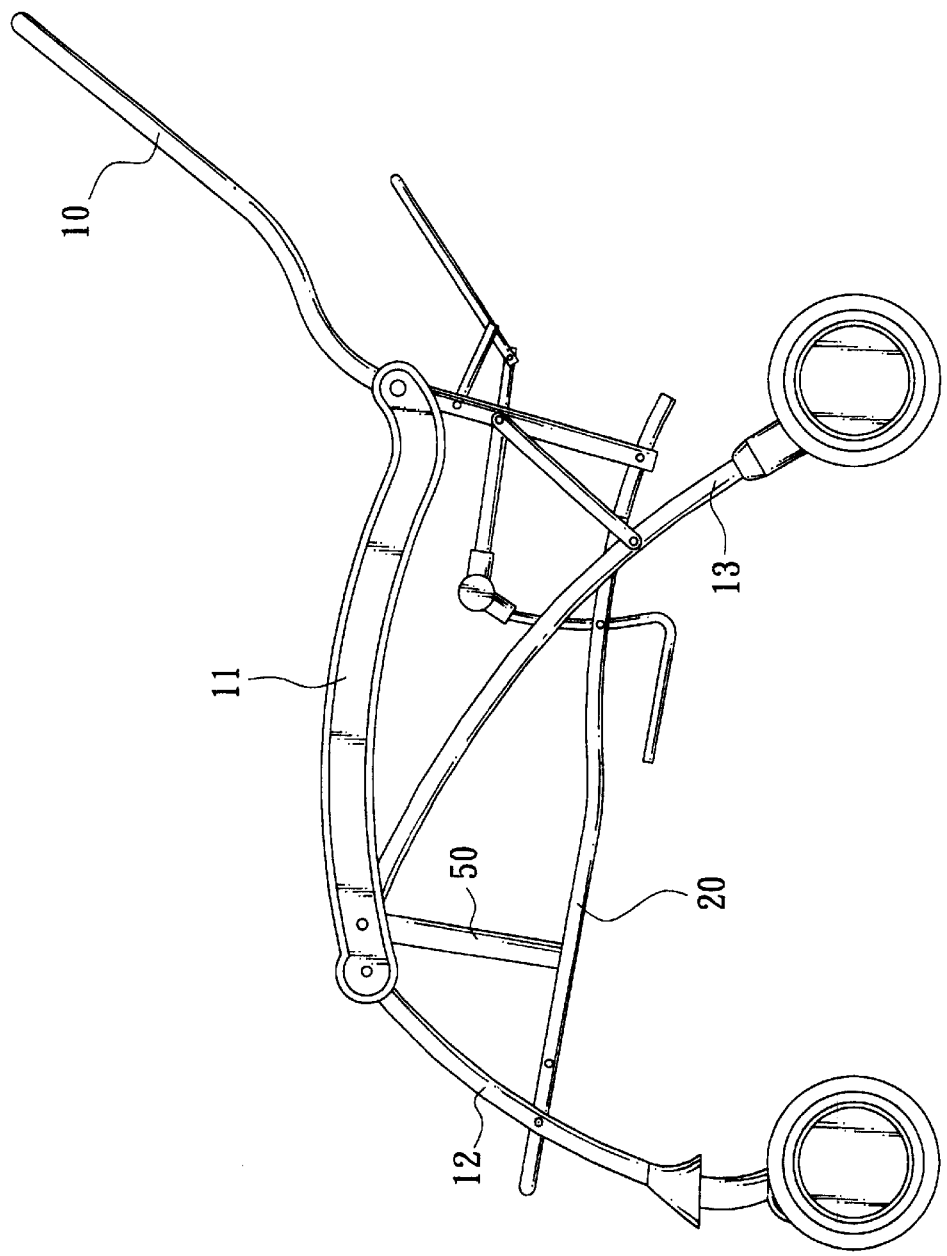
FIG. 1 is a schematic side view of an infant stroller of with extended length, including a non-extendable rod 50.
Figure 5:
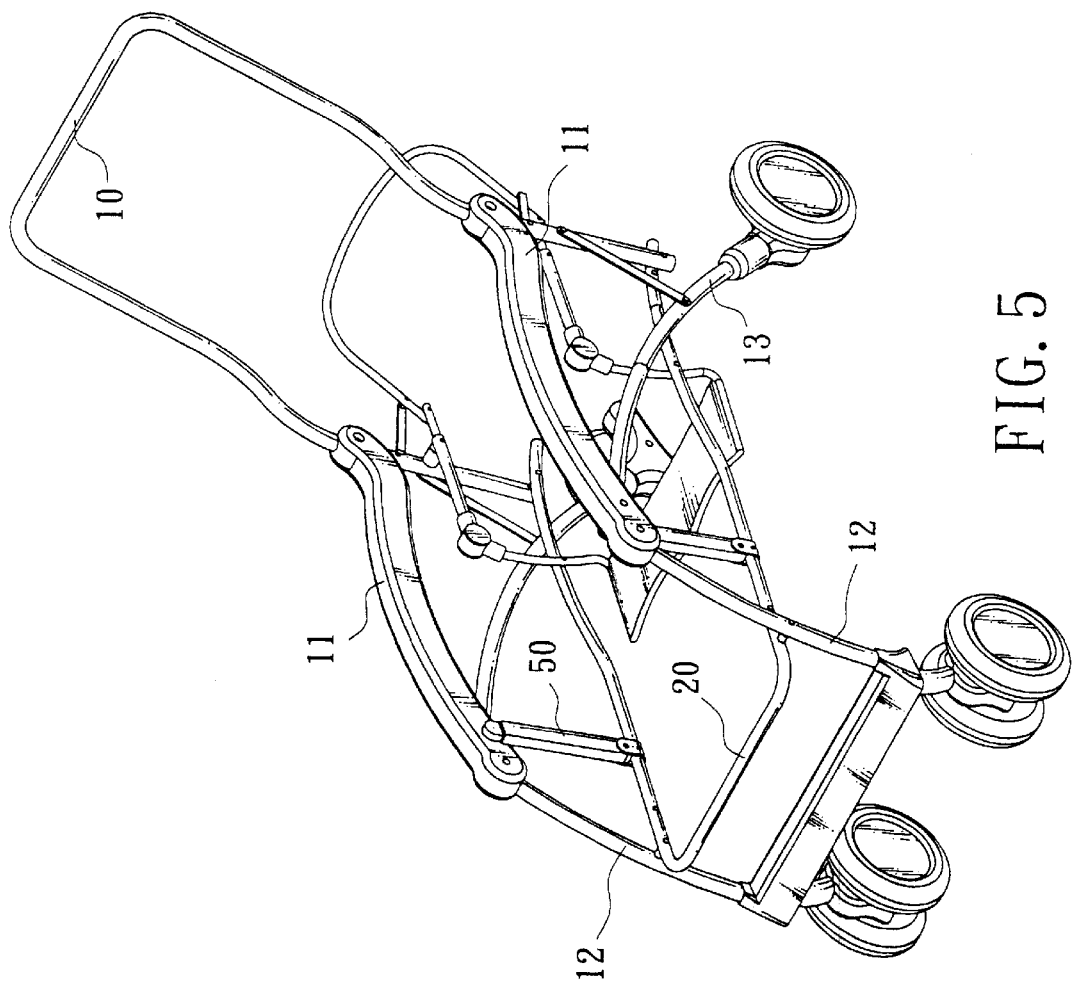
FIG. 5 is a perspective view of an infant stroller with an extended length, including a non-extendable rod 50.

Referring to FIGS. 1 and 5 for an embodiment of the invention, the frame is adapted for use on an infant stroller to hold one or more infant seats. The frame includes at least a handle bracket 10, armrests 11, front wheel brackets 12, rear wheel brackets 13 and a seat bracket 20. The handle bracket 10 is substantially formed in an inverse "U" shape, and is located at the rear end of the infant stroller in an upright or inclined manner. The handle bracket has two arms extending downwards and a horizontal middle section for people to grip to push the stroller forwards or backwards, or to turn. The armrests 11 are horizontally located on two sides of the frame with rear ends pivotally engaging with the handle bracket 10. When the frame is folding, the armrests 11 may be pivotally turned and moved towards the handle bracket 10 for folding. To those skilled in the art, it is known that the handle bracket 10 may be made in forms other than the inverse "U" as shown in FIG. 1. For instance, the handle bracket may adopt the one disclosed in U.S. Pat. No. 5,882,030 that consists of two parallel and tilted rods located independently at the rear end of the infant stroller. Another alternative embodiment is to add a pair of handgrips on the bracket.

The front wheel bracket 12 has a lower end coupled with a wheel anchor block to pivotally engage with a front wheel (construction of the wheel anchor block is known in the prior art, and thus is not shown in the drawings). The wheel anchor block may be turned left or right to change the direction of the front wheel so that the infant stroller may be turned in the desired direction. The front wheel bracket 12 also has an upper end pivotally engaging with the front end of the armrest 11. The rear wheel bracket 13 is located on one side of the infant stroller in an inclined manner, and has an upper end pivotally engaging with the front end of the armrest 11 (adjacent to the upper end of the front wheel bracket 12), and a lower end pivotally engaging with a rear wheel through another wheel anchor block (construction of the wheel anchor block is known in the prior art, and thus is not shown in the drawings). In order to save transportation and storage space, the pivotal axes on the upper ends of the front wheel bracket 12 and rear wheel bracket 13 are spaced close to each other. Hence the front wheel bracket 12 and the rear wheel bracket 13 may be pivotally turned and moved close to each other when the frame is folding.

In order to install the seat on the stroller, the front end of the seat bracket 20 is pivotally engaged with the front wheel bracket 12, and the rear end of the seat bracket 20 is pivotally engaged with the handle bracket 10. The pivotal fastening at the front end and rear end allows the seat bracket 20 to support a substantial amount of loading. Infant seats may then be mounted to the seat bracket 20. To those skilled in the art, it is known that the seat bracket 20 may be made of an elongated metal frame or platform as long as it has enough longitudinal length to pivotally engage with the front wheel bracket 12 and handle bracket 10, and has a sufficient width and upper space to accommodate the infant seats.

For the infant stroller with an extended length, the backrest of the front seat usually requires an additional support. Hence a rod 50 is provided to bridge the armrest 11 and seat bracket 20 for holding the backrest of the seat.

Figure 2A:
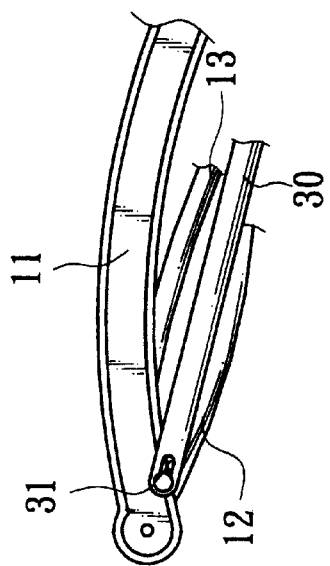
FIG. 2A is a fragmentary side view of an infant stroller before folding, with the fastening element located at a lower end of the slot of a linkage bar.
Figure 2B:
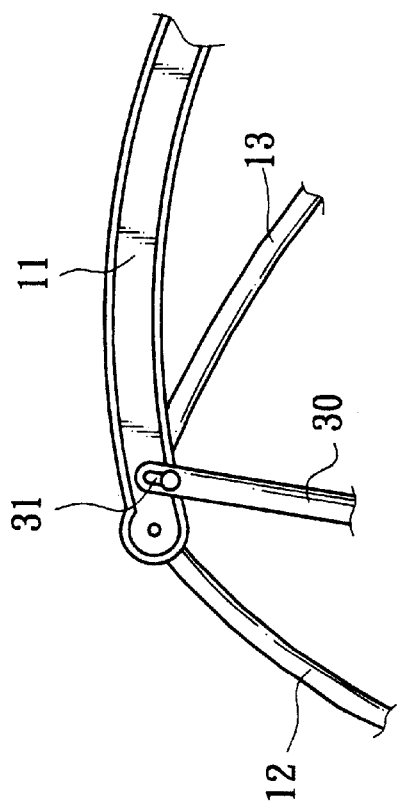
FIG. 2B is a fragmentary side view of an infant stroller after folding, with the fastening element located at an upper end of the slot of a linkage bar.
Figure 6:
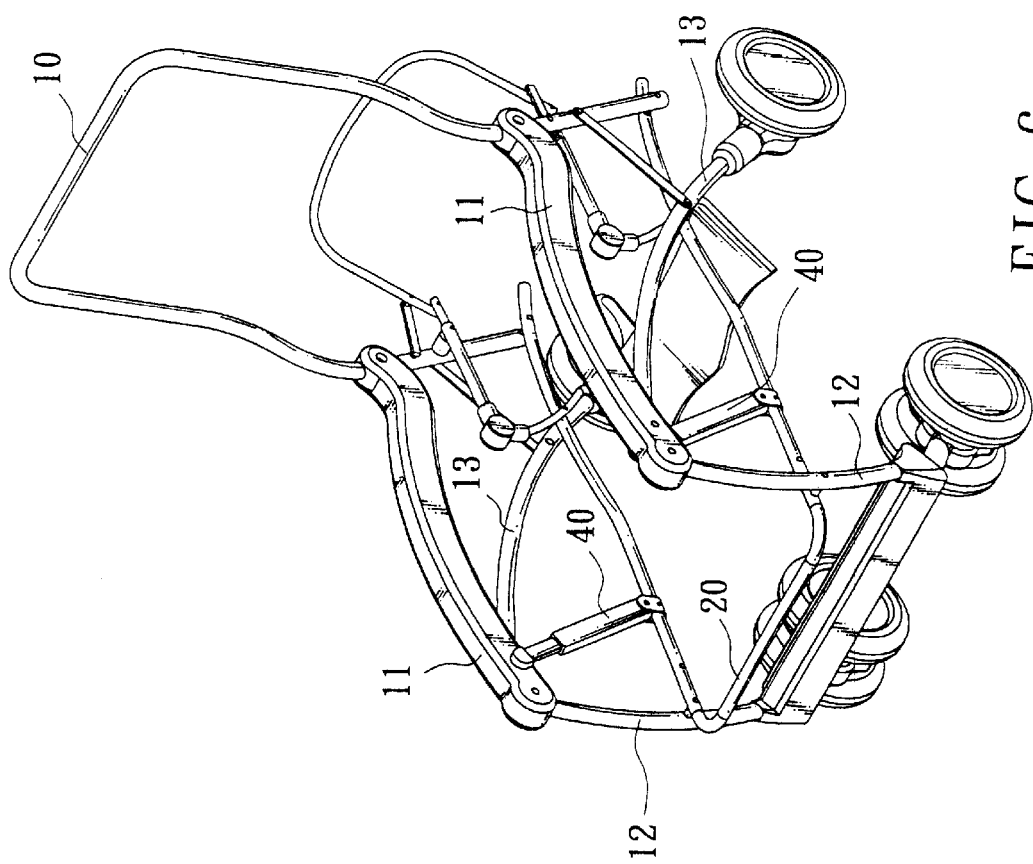
FIGS. 6, 7 and 8 are schematic views of an infant stroller of the invention at various folding conditions.
Figure 7:
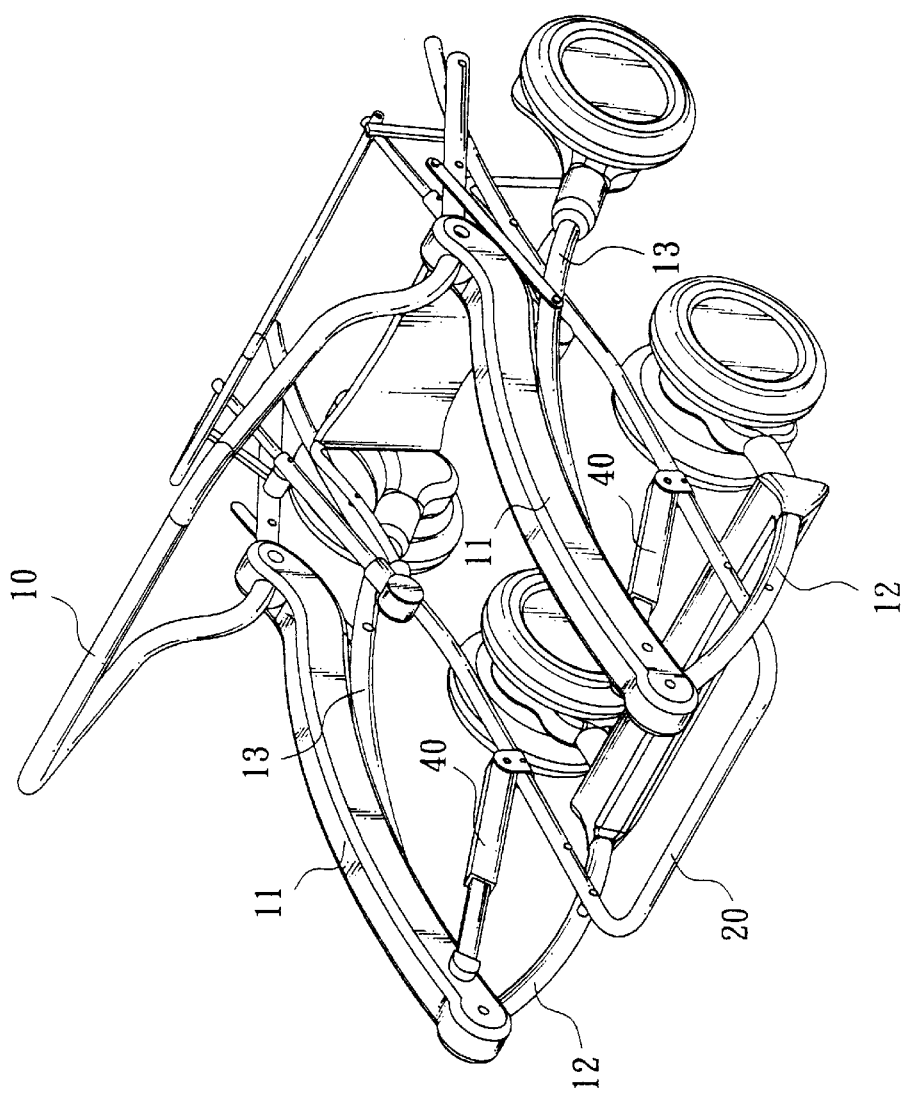
Figure 8:
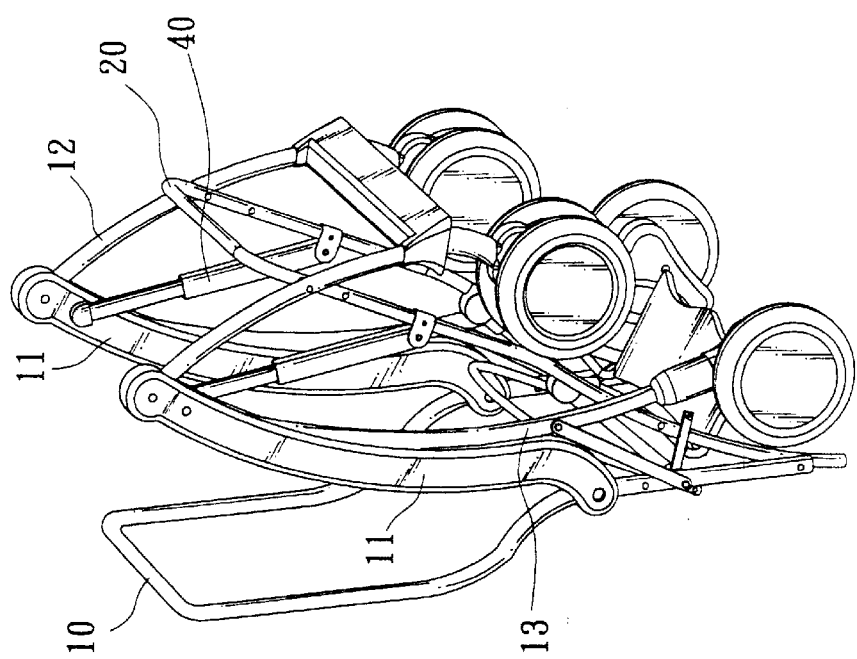

As shown in FIGS. 6, 7 and 8, when the frame is folding, the relative positions of the armrest 11 and seat bracket 20 will change continuously. The length of the rod 50 is also changed, otherwise the whole frame cannot be completely folded. To resolve this issue, a conventional practice is to use a linkage bar 30 to replace the rod 50 (as shown in FIGS. 2A and 2B). The linkage bar 30 has a slot 31 formed on an upper end thereof with a fastening element running through the slot 31 to pivotally engage with the armrest 11. Before folding (as shown in FIG. 2A), the fastening element is located at a lower end of the slot 31. After folding (as shown in FIG. 2B), the fastening element is located at an upper end of the slot 31. Hence, although the linkage bar 30 is not extendable, it does not affect the folding of the frame.

However, the slot 31 and the fastening element set forth above are exposed. They are prone to catch or tear seat covers or injure people's hands. It has safety concerns when in use.

Figure 3:
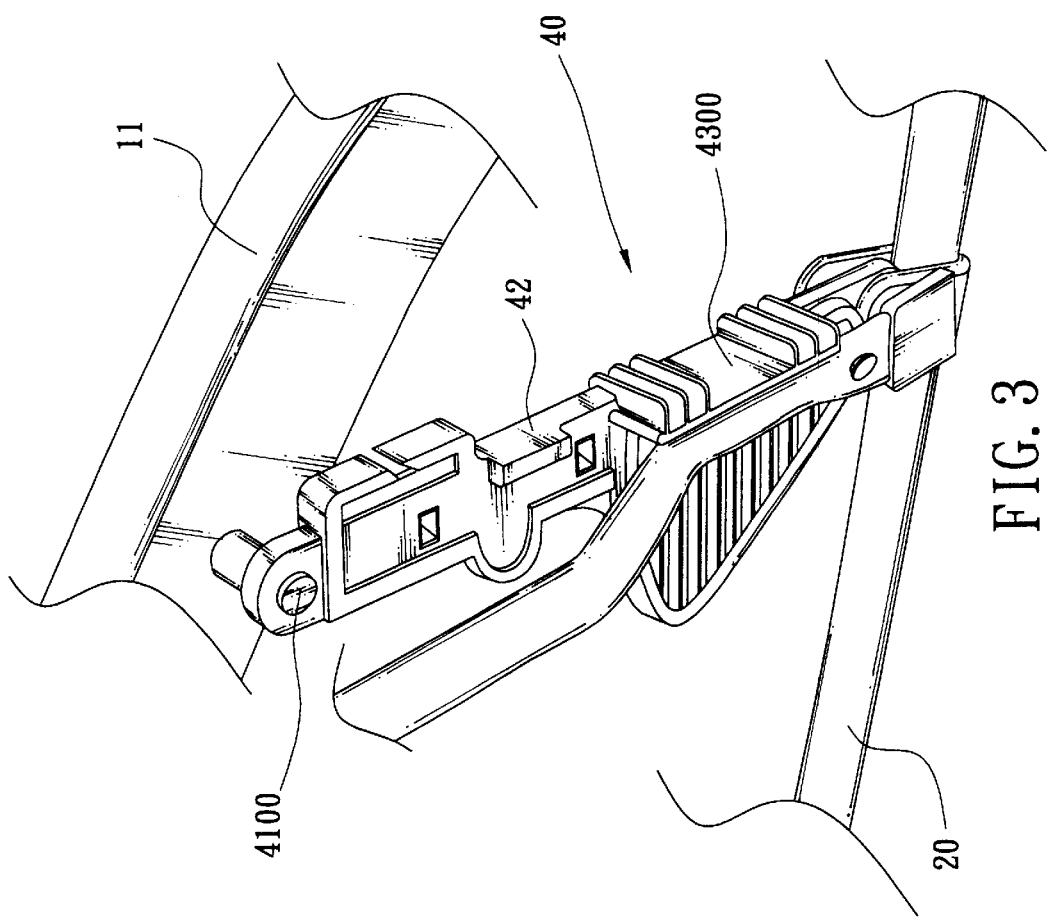
FIG. 3 is a perspective view of an improved extendable rod of the invention.
Figure 4:
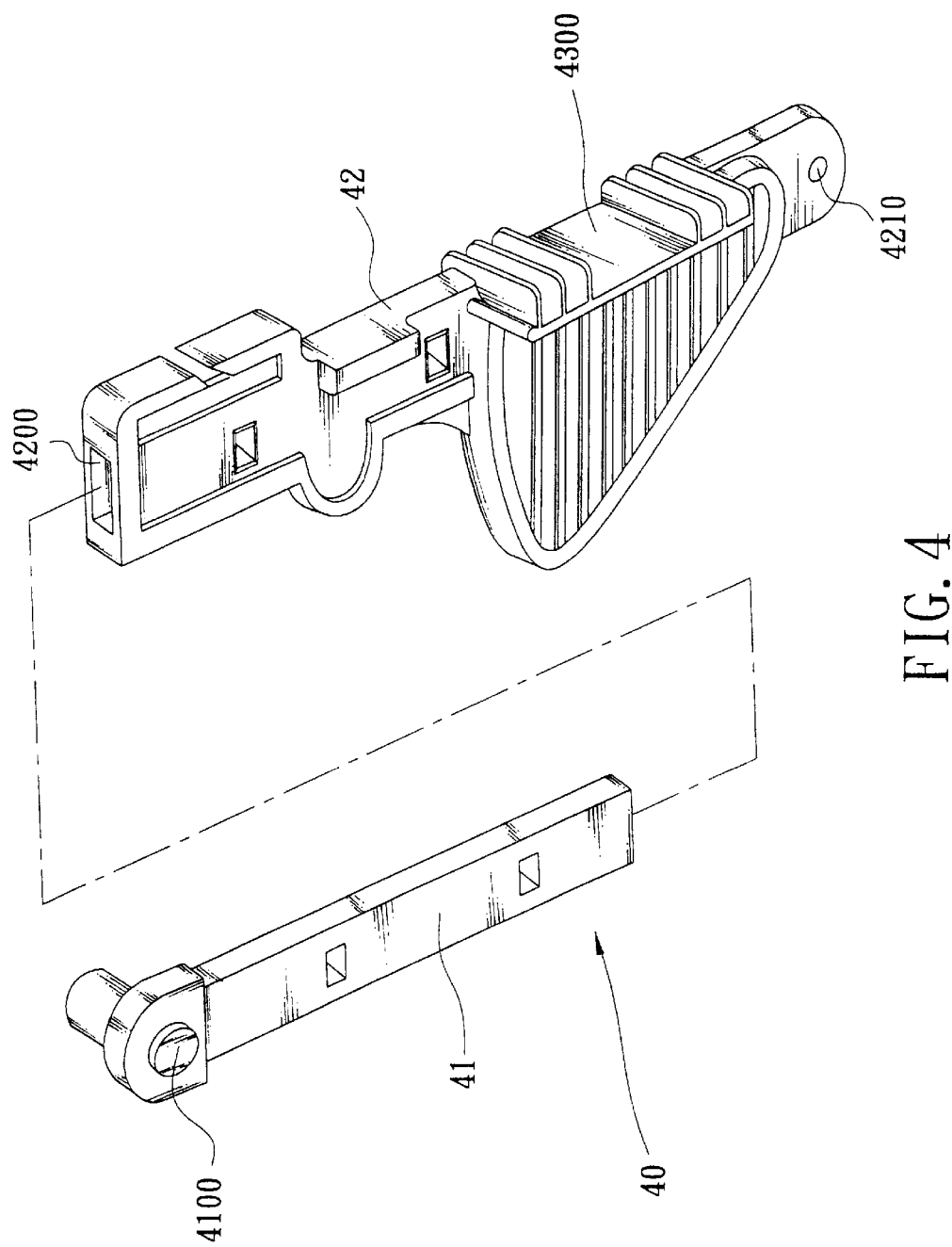
FIG. 4 is an exploded view of an improved extendable rod of the invention.

Referring to FIGS. 3 and 4 for an improvement for the extendable rod of the invention, the extendable rod 40 consists of an inner rod 41 and an outer rod 42. The outer rod 42 has a longitudinal trough 4200 to house the inner rod 41 and allows the inner rod 41 to slide reciprocally therein. For installation, insert the inner rod 41 into the longitudinal trough 4200 of the outer rod 42, then pivotally engage an upper axis 4100 of the inner rod 41 with the armrest 11, and pivotally engage a lower axis 4210 of the outer rod 42 with the seat bracket 20. Then the armrest 11 and seat bracket 20 can prevent the inner rod 41 from moving away from the longitudinal trough 4200 of the outer rod 42.

As shown in FIG. 5, when fastening to a rod 50 that is not extendable, the whole frame cannot be folded. With the improved extendable rod 40 of the invention, as shown in FIGS. 6, 7 and 8, the extendable rod 40 may be extended or retracted along the continuous change of the relative position of the armrest 11 and seat bracket 20. There are no slots or screws exposed outside the extendable rod 40. Hence it looks more attractive and is safer to use.

To those skilled in the art, it is known that the improved extendable rod 40 of the invention can be made of ordinary metals, plastics, or high strength engineering plastics by injection forming processes. In addition, the exterior of the outer rod 42 may be formed in various desired shapes. FIG. 3 illustrates an example in which jutting rims 4300 are formed on an exterior side of the outer rod 42 for supporting accessories of the frame.

While the preferred embodiments of the invention have been set forth for the purpose of disclosure, modifications of the disclosed embodiments of the invention as well as other embodiments thereof may occur to those skilled in the art. For instance, the locations of the inner rod 41 and outer rod 42 may be interchanged from an upper location to a lower location, or vice versa. The material may also have other different selections. Accordingly, the appended claims are intended to cover all embodiments which do not depart from the spirit and scope of the invention.

What is claimed is:

1. A folding structure for an infant stroller having a foldable frame for reducing storage space when the frame is folded, the frame comprising at least:

a handle bracket located at a rear end of the infant stroller in an upright or an inclined manner for moving the infant stroller;

an armrest having one end pivotally engaged with the handle bracket;

a front wheel bracket located at a front end of the infant stroller having a first upper end pivotally engaged with a first front end of the armrest and a first lower end pivotally engaged with a front wheel;

a rear wheel bracket located at one side of the infant stroller having a second upper end pivotally engaged with a second front end of the armrest and a second lower end pivotally engaged with a rear wheel;

a seat bracket having one end pivotally engaged with the front wheel bracket and another end pivotally engaged with the handle bracket; and an extensible rod having a third upper end pivotally engaged with the armrest and a third lower end pivotally engaged with the seat bracket, and having a changeable length according to change of relative positions of the seat bracket and the armrest when the frame is folding, wherein the extensible rod includes at least:

an outer rod having a longitudinal trough formed therein, the trough having an opening located at/one end of the outer rod, the outer rod further having a first pivotal axis located at another end thereof, and having at least one exterior side with a jutting rim formed thereon; and an inner rod having one end inserting into the longitudinal trough and slidable reciprocally in the longitudinal trough, and another end thereof having a second pivotal axis formed thereon.

2. The folding structure for an infant stroller of claim 1, wherein the extensible rod includes at least:

an outer rod having a longitudinal trough formed therein, the trough having an opening located at one end of the outer rod, the outer rod further having a first pivotal axis located at another end thereof; and an inner rod having one end inserting into the longitudinal trough and slidable reciprocally in the longitudinal trough, and another end thereof having a second pivotal axis formed thereon.

3. The folding structure for an infant stroller of claim 2, wherein the outer rod has a lower end pivotally engaging with the seat bracket.

4. The folding structure for an infant stroller of claim 2, wherein the inner rod has an upper end pivotally engaging with the armrest.

5. The folding structure for an infant stroller of claim 2, wherein the outer rod has an upper end pivotally engaging with the armrest.

6. The folding structure for an infant stroller of claim 2, wherein the inner rod has a lower end pivotally engaging with the seat bracket.

7. The folding structure for an infant stroller of claim 1, wherein the outer rod has a lower end pivotally engaging with the seat bracket.

8. The folding structure for an infant stroller of claim 1, wherein the inner rod has an upper end pivotally engaging with the armrest.

9. The folding structure for an infant stroller of claim 1, wherein the outer rod has an upper end pivotally engaging with the armrest.

10. The folding structure for an infant stroller of claim 1, wherein the inner rod has a lower end pivotally-engaging with the seat bracket.

11. The folding structure for an infant stroller of claim 1, wherein the rear wheel bracket engages with the armrest on a third pivotal point which is proximate to a front end of the armrest to allow the rear wheel bracket forming a decreased angle with the front wheel bracket to move closely to the front wheel bracket when the frame is folding.

* * * * *